United States Patent [19]

Haskett et al.

[11] 3,961,942

[45] June 8, 1976

[54] HYDROMETALLURGICAL PROCESS FOR COPPER RECOVERY FROM SULFIDE ORES

[75] Inventors: Philip R. Haskett; Carl H. Elges, III; Donald J. Bauer; Roald E. Lindstrom, all of Reno, Nev.

[73] Assignee: The United States of America as represented by the Secretary of the Interior, Washington, D.C.

[22] Filed: Mar. 19, 1975

[21] Appl. No.: 559,942

Related U.S. Application Data

[63] Continuation-in-part of Ser. No. 413,408, Nov. 6, 1973, abandoned.

[52] U.S. Cl............................. 75/101 BE; 75/117; 423/27; 423/604
[51] Int. Cl.².............................................. C22B 15/00
[58] Field of Search............ 75/117, 101 R; 423/27, 423/28, 41, 109, 604; 204/106, 116

[56] References Cited
UNITED STATES PATENTS
2,165,667  7/1939  Traut................................. 423/604

*Primary Examiner*—G. Ozaki
*Attorney, Agent, or Firm*—William S. Brown; Donald R. Fraser

[57] ABSTRACT

Recovery of copper from sulfide ores is achieved by placing the ore together with a caustic soda or potash solution in a pressure vessel. An oxidizing gas is then introduced into the vessel and the temperature and pressure of the system is adjusted as required. Copper ions are freed from the crystalline structure in the form of the complex anion, $Cu(OH)_4^=$. The copper may then be recovered by reduction or precipitation as cupric oxide.

9 Claims, No Drawings

HYDROMETALLURGICAL PROCESS FOR COPPER RECOVERY FROM SULFIDE ORES

This application is a continuation-in-part of application Serial No. 413,408, filed November 6, 1973, now abandoned.

BACKGROUND OF THE INVENTION

Hydrometallurgy involves the reduction of ores and minerals by washing out insoluble matter with various liquids.

The great majority of copper produced in the world today is recovered from sulfide ores and concentrates by smelting processes. These smelting processes suffer from the fact that large quantities of sulfur dioxide are produced. Unless controlled, the sulfur dioxide poses a serious threat to the environment due to its toxic and poisonous nature. Thus, smelting processes have found it necessary to abate the expulsion of such gases into the atmosphere. However, current methods for removal of sulfur dioxide from stack gases are generally found to be uneconomical because the products which may be derived from the gas (sulfuric acid, sulfurous acid, or sodium sulfite) are generally produced at too great a distance from market areas to justify shipping costs. As a result, most process gases remain untreated and are discarded into the atmosphere creating severe environmental pollution problems.

Hydrometallurgical processes have been developed in order to overcome the problem of sulfur dioxide emissions. Unfortunately, none of these processes appear commercially practicable at the present time. Horton, in his U.S. Pat. No. 2,970,096, developed a means for treating oxidized copper ores. Such ores were leached with an alkaline leach solution while scrubbing the ore particles to remove the silica gel therefrom. Horton's process found particular use in connection with oxidized copper ores which contain calcium and/or magnesium carbonates.

Another means for recovering copper has been by use of ammonia systems. However, such processes present serious problems in the recovery and recycling of ammonia. The use of acid systems for oxidative leaching are effective only under conditions of temperature and pressure that yield excessive corrosion of equipment.

Accordingly, it is an object of our invention to provide a method whereby copper may be recovered from sulfide ores in both an economic and pollution free manner.

It is a further object of our invention to provide a means for reducing atmospheric pollution by development of a nonsmelting method of copper production.

THE INVENTION

We have found that copper may be recovered from sulfide ores through treatment in a caustic media with an oxidizing gas under pressure. Broadly, the process of our invention involves pressure oxidation of sulfide copper ores and concentrates, as well as the concomitant leaching thereof. Our invention is particularly useful in the recovery of copper from such sulfide ore minerals as covellite, chalcocite, bornite, and chalcopyrite.

Oxidation of the sulfide minerals frees the copper ions from the crystalline structure, and the copper is dissolved as the complex anion, $Cu(OH)_4^=$. The sulfur in the mineral is generally oxidized to the sulfate. When the process involves the treatment of an iron-bearing mineral, such as chalcopyrite ($CuFeS_2$), the iron (II) is oxidized to iron (III), which hydrolyzes to insoluble ferric oxide. The iron oxide residue, which may be of commercial value, is easily and efficiently removed by filtration.

The reaction involved in the oxidation leaching of copper from a sulfide mineral such as chalcopyrite may be illustrated:

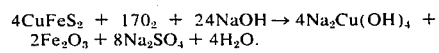
$$4CuFeS_2 + 17O_2 + 24NaOH \rightarrow 4Na_2Cu(OH)_4 + 2Fe_2O_3 + 8Na_2SO_4 + 4H_2O.$$

It is feasable to regenerate the base consumed by such conventional means as the LeBlanc process treatment of the sodium sulfate.

In recovering the copper from the above reaction, such means as reduction or precipitation as cupric oxide may be employed.

In carrying out the process of our invention, the initial step is to place the ore or concentrate in a pressure vessel along with a solution of caustic soda or potash. Conventional autoclaves are suitable reaction vessels for our process. After placing the ore and caustic solution in the pressure vessel, the system is closed and an oxidizing gas is introduced into the vessel. Common oxidants suitable for use in our process include oxygen and air. Of these, oxygen is preferred, since air requires much higher operating pressures.

The temperature and pressure of the system is adjusted to the required levels during the period of gas introduction. Pressures of from about 20 to about 500 psig of oxygen produced favorable results over a temperature range of from 25° to 200°C. A preferred range of from about 80 to about 200 psig oxygen was determined. Preferred temperature conditions for the oxidation process range from about 60° to 120°C. Both the temperature and pressure may vary within the ranges noted with a trade off to achieve similar conditions. That is, one may produce an increased temperature and corresponding decrease in pressure and establish similar conditions. It is preferred to use a temperature and pressure that will require a minimum contact time for the copper bearing material during the leaching process.

We have found that the sodium or potassium hydroxide solution can be loaded into the vessel at concentrations equal to and greater than 3 percent by weight and produce satisfactory results. A range of 10 to 20 percent by weight or greater of caustic is preferred.

The caustic solution can be loaded to approximately 10 grams per liter of copper. Since the copper saturation level is about 10 grams, one should estimate the amount of copper expected to be recovered from the copper bearing source before beginning the oxidation process.

The length of the optimum reaction time varies depending upon the oxidizing conditions. Generally, periods of from about one half to about 3 hours are adequate when working within the temperature and pressure conditions noted above. Minimum contact time is preferable to avoid dehydration of the copper anion complex.

The following examples will serve to more fully illustrate the method of our invention:

EXAMPLE 1

A sample of bornite ($Cu_5FeS_4$) which contained 56 percent by weight copper was loaded into an autoclave. The sample was leached in 250 gram per liter sodium hydroxide (about a 25% solution) for a period of 60 minutes in the autoclave at a temperature of 100°C and a partial pressure of oxygen equal to 200 psig. As a result, 93 percent dissolution of copper was achieved.

EXAMPLE 2

In the same manner as Example 1, a sample of chalcocite ($Cu_2S$) was treated. The sample contained 56 percent copper by weight. The treatment resulted in 94 percent dissolution of the copper.

EXAMPLE 3

A mill concentrate consisting primarily of chalcopyrite, which analyzed 27 percent copper, was treated according to the process of our invention. The concentrate was oxidized at a partial pressure of 80 psig with oxygen. The treatment was carried out at a temperature of 120°C for a period of one hour. An 82 percent dissolution of copper was achieved.

EXAMPLE 4

Recycling of the residue material obtained in Example 3, through a second pressure-leach oxidation cycle, resulted in greater than 99 percent recovery of the copper values.

During each of the above examples, a coating of $Fe_2O_3$ or $Fe_2O_4$, which was deposited on the walls and parts of the reaction chamber, served to protect the materials of construction from the mildly corrosive effects of the base solution.

Similar experimental results were obtained for the mineral covellite (CuS).

The copper which is dissolved in the base solutions according to the process of our invention can be recovered from the base solution by processes such as dehydration-precipitation or by reduction.

As can be observed from the foregoing examples, the process of our invention eliminates the production of sulfur dioxide such as occurs in conventional smelting operations for recovering copper. Our process provides a highly efficient recovery of copper values from ores or concentrates. Furthermore, the conditions favorable to oxidation in the caustic medium are milder than those required in acid medium. Our process based on the use of caustic leachants produces no gaseous materials that are expensive to reclaim or dispose of, as occurs in ammonia leaching techniques.

Certainly our invention as described herein may be embodied in other specific forms without departing from the spirit or essential characteristics thereof. The present embodiments are therefore to be considered in all respects as illustrative and not restrictive.

We claim:

1. A process for the recovery of copper from sulfide ores or concentrates comprising leaching the ore or concentrate in a concentrated caustic solution with an oxidizing gas at a pressure of from about 80 to about 200 psig, and at a temperature of from about 25° to about 200°C, whereby the dissolution of copper from the ore or concentrate is effected.

2. The process of claim 1, wherein the oxidizing gas is oxygen.

3. The process of claim 1, wherein the caustic solution is selected from the group consisting of sodium hydroxide and potassium hydroxide.

4. The process of claim 1, wherein the temperature ranges from about 60° to about 120°C.

5. The process fo claim 1 in which the ore is bornite.

6. The process of claim 1 in which the ore is chalcopyrite.

7. The process of claim 1 in which the ore is chalcocite.

8. The process of claim 1 in which the ore is covellite.

9. The process of claim 1 in which the concentration of the caustic solution is in the range of 10 to 20 percent by weight.

* * * * *